United States Patent
Ganesan et al.

(10) Patent No.: US 11,537,416 B1
(45) Date of Patent: Dec. 27, 2022

(54) DETECTING AND HANDLING NEW PROCESS SCENARIOS FOR ROBOTIC PROCESSES

(71) Applicant: NTT DATA Services, LLC, Plano, TX (US)

(72) Inventors: Dhurai Ganesan, Chennai (IN); Gowrishanker Pari, Chennai (IN); Aananthanarayanan Pandian, Chennai (IN); Ujjwal Sharma, Chennai (IN); Harsh Vinayak, Gurgaon (IN)

(73) Assignee: NTT DATA SERVICES, LLC, Plano, TX (US)

( * ) Notice: Subject to any disclaimer, the term of this patent is extended or adjusted under 35 U.S.C. 154(b) by 0 days.

(21) Appl. No.: 17/344,565

(22) Filed: Jun. 10, 2021

(51) Int. Cl.
  *G06F 9/451* (2018.01)
  *G06N 20/00* (2019.01)
  *G06F 9/445* (2018.01)
  *G06F 11/34* (2006.01)

(52) U.S. Cl.
  CPC .......... *G06F 9/451* (2018.02); *G06F 9/44505* (2013.01); *G06F 11/3438* (2013.01); *G06N 20/00* (2019.01)

(58) Field of Classification Search
  CPC ...................................................... G06F 3/048
  See application file for complete search history.

(56) References Cited

U.S. PATENT DOCUMENTS

| | | | |
|---|---|---|---|
| 7,039,654 B1 | 5/2006 | Eder | |
| 7,937,349 B2 | 5/2011 | Pucher | |
| 8,359,287 B2 | 1/2013 | Pucher | |
| 2006/0200767 A1* | 9/2006 | Glaeske | G06Q 10/10 715/700 |
| 2017/0352041 A1 | 12/2017 | Ramamurthy et al. | |
| 2018/0165264 A1* | 6/2018 | Venkataraman | G06F 40/174 |
| 2020/0104247 A1* | 4/2020 | Raghavan | G06F 11/3684 |
| 2020/0134374 A1 | 4/2020 | Oros | |
| 2021/0256434 A1* | 8/2021 | Dubey | G06N 5/043 |
| 2022/0083330 A1* | 3/2022 | Monakova | G06F 9/453 |
| 2022/0113994 A1* | 4/2022 | Singh | G06F 9/451 |

FOREIGN PATENT DOCUMENTS

| | | |
|---|---|---|
| JP | 6750838 B1 | 9/2020 |
| WO | WO-00070481 A1 | 11/2000 |

* cited by examiner

*Primary Examiner* — Di Xiao
(74) *Attorney, Agent, or Firm* — Shackelford, Bowen, McKinley & Norton, LLP

(57) ABSTRACT

In an embodiment, a method of real-time process monitoring includes initiating monitoring of user interface (UI) activity in a plurality of user environments in which a user-executed process is performed. The user-executed process is defined in a stored instruction set that identifies a plurality of steps of the user-executed process. The plurality of user environments include a first environment operated by a human worker and a second environment operated by a bot. The method also includes, responsive to the initiating, detecting a new process scenario for the user-executed process. The method also includes determining new bot logic for the new process scenario. The method also includes causing the bot to implement the new bot logic.

20 Claims, 7 Drawing Sheets

DETECTING AND HANDLING NEW PROCESS SCENARIOS FOR ROBOTIC PROCESSES

BACKGROUND

Technical Field

The present disclosure relates generally to the deployment and utilization of bots for automated tasks and more particularly, but not by way of limitation, to skill calibration for systems utilizing bots.

History of Related Art

Task automation, while often desirable, is not always feasible. Robotic process automation (RPA) platforms have a tendency to provide a framework for automating tasks without providing a streamlined way to learn and adapt. Typically, extensive human intervention is necessary, which limits RPA's scope and volume of use.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of real-time process monitoring. The method includes initiating monitoring of user interface (UI) activity in a plurality of user environments in which a user-executed process is performed. The user-executed process is defined in a stored instruction set that identifies a plurality of steps of the user-executed process. The plurality of user environments include a first environment operated by a human worker and a second environment operated by a bot. The method also includes, responsive to the initiating, detecting a new process scenario for the user-executed process. The method also includes determining new bot logic for the new process scenario. The method also includes causing the bot to implement the new bot logic. Other embodiments of this aspect include corresponding computer systems, apparatus, and computer programs recorded on one or more computer storage devices, each configured to perform the actions of the methods.

In an embodiment, another general aspect includes a computer system that has a processor and memory. The processor and the memory in combination are operable to implement a method. The method includes initiating monitoring of user interface (UI) activity in a plurality of user environments in which a user-executed process is performed. The user-executed process is defined in a stored instruction set that identifies a plurality of steps of the user-executed process. The plurality of user environments include a first environment operated by a human worker and a second environment operated by a bot. The method also includes, responsive to the initiating, detecting a new process scenario for the user-executed process. The method also includes determining new bot logic for the new process scenario. The method also includes causing the bot to implement the new bot logic.

In an embodiment, another general aspect includes a computer-program product that includes a non-transitory computer-usable medium having computer-readable program code embodied therein. The computer-readable program code is adapted to be executed to implement a method. The method includes initiating monitoring of user interface (UI) activity in a plurality of user environments in which a user-executed process is performed. The user-executed process is defined in a stored instruction set that identifies a plurality of steps of the user-executed process. The plurality of user environments include a first environment operated by a human worker and a second environment operated by a bot. The method also includes, responsive to the initiating, detecting a new process scenario for the user-executed process. The method also includes determining new bot logic for the new process scenario. The method also includes causing the bot to implement the new bot logic.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
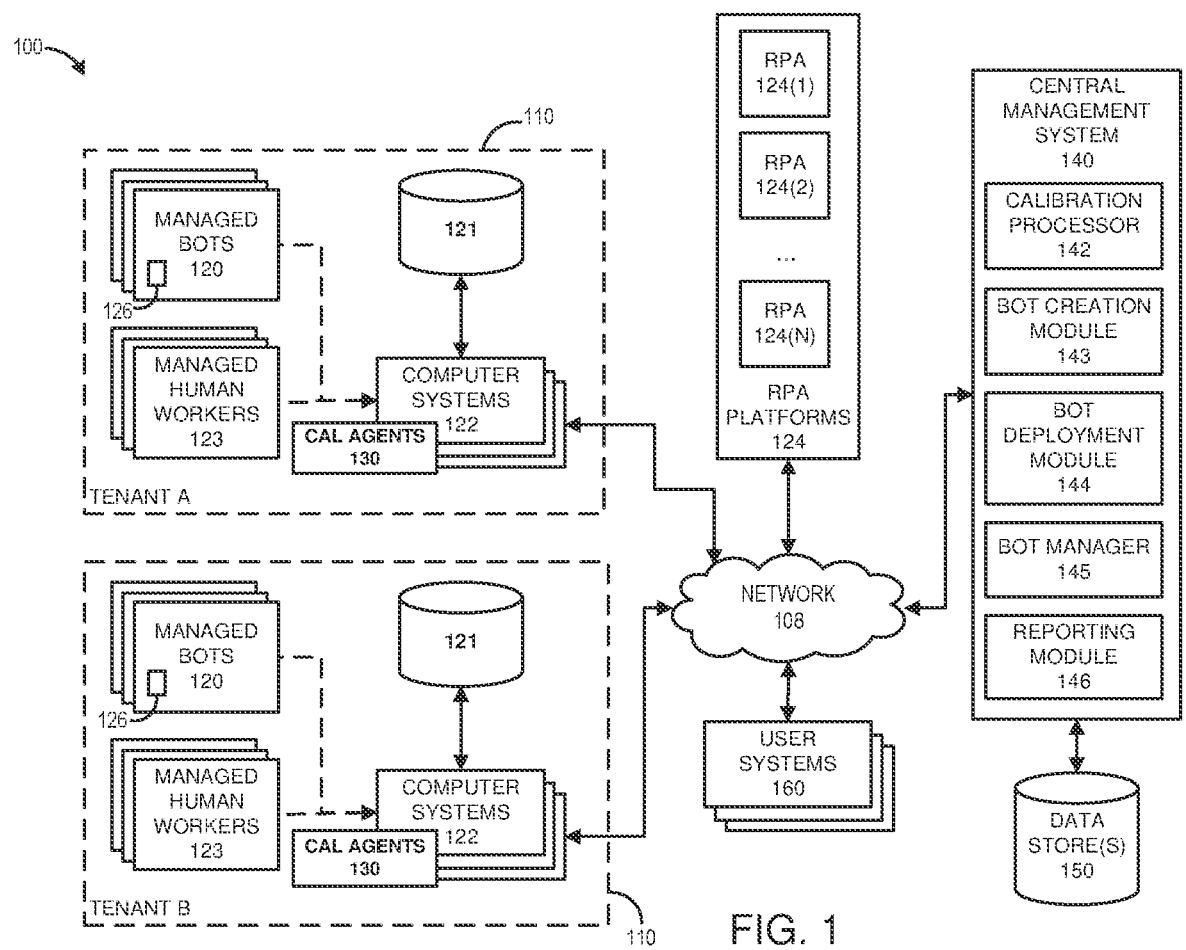
FIG. 1 illustrates an example of a system for implementing a central management system.

Robotic process automation (RPA) is the use of software, typically in combination with artificial intelligence (AI) and machine learning capabilities, to handle high-volume sequences of repeatable tasks that previously required humans to perform. These tasks can include interacting with a user interface (UT), for example, to perform, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

Although bots, potentially in combination with human workers, can provide greater efficiency via increased automation, bots introduce numerous technical problems. For example, bots and human workers often do not perform at the same skill level. An experienced human worker with subject-matter expertise may go about a process differently than a less experienced human worker or a bot. As another example, UIs and user-executed processes sometimes change. For example, data fields may be relocated within a given UI. While an experienced human worker may easily identify and address the relocation of a login screen, for example, it is typically more difficult for a bot to identify and adapt to such a change. As yet another example, it is generally difficult to reliably identify, in a real-time fashion, differences or discrepancies in the execution of user-executed processes, such as missed process steps or irregularities in how such processes are performed. Therefore, even if certain tasks are capable of automation as robotic processes in a technical sense, it often becomes prohibitively resource-intensive to create and constantly adapt bots for every such automation. Bots do not scale well in many cases due to the extensive amount of human intervention that is usually required to create, tune, and adapt bots. Furthermore, it is technically challenging to calibrate skillsets of different users, whether human or bot, such that all perform a given user-executed process satisfactorily.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. Inputs from any of these devices, in possible combination with specific UI objects or components, can be considered examples of UI events. For illustrative purposes, various examples will be described herein relative to GUIs and UI events that are detected or received in relation to GUIs. It should be appreciated, however, that the principles described herein are applicable to any type of UI, inclusive of the example UIs mentioned previously. A user, unless specifically stated otherwise, or otherwise understood within the context as used, can include any entity, including a human or bot, that can interact with a UI.

The present disclosure describes examples of automatic, real-time or on-demand skill calibration for user-executed processes. In some cases, the user-executed processes can be executed by human workers and/or by bots as robotic processes. In certain embodiments, UI activity, representative of a user-executed process in a computing environment, is monitored and recorded in real-time. In general, the UI activity can include any action taken by a user in a UI provided by the computing environment. In certain embodiments, a software agent records the UI activity via receipt of a live screen output of the computing environment and via detection of UI events in the computing environment. The software agent can generate structured UI activity data related to the UI activity and execute configurable logic based thereon.

FIG. 1 illustrates an example of a system 100 for implementing a central management system 140 for user-executed processes. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more managed human workers 123, one or more computer systems 122 and one or more data sources 121. The one or more computer systems 122 can each provide a computing environment, inclusive of applications and corresponding UIs and dashboards, for executing configurable tasks. As illustrated, any given one of the computer systems 122 may be operated by one of the managed bots 120 or one of the human workers 123. In some cases, the computer systems 122 may represent desktop virtualization environments. In such cases, the human workers 123, for example, may operate the user systems 160 and access the desktop virtualization environments over the network 108.

The one or more data sources 121 of each of the tenant systems 110 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, manually by the human workers 123 and/or robotically by the managed bots 120. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 can include calibration agents 130. The calibration agents 130 are software agents that can be used to facilitate automated creation of some or all of the managed bots 120. In certain embodiments, the calibration agents 130 can be individually triggered, for example, by a human user of one of the user systems 160, to monitor and record user activity in the computing environments provided by the computer systems 122. The user activity can represent, for example, user-executed processes in the computing environments. The user activity can include, for example, UI activity.

In the illustrated embodiment, the central management system 140 can include a calibration processor 142, a bot manager 145, a bot deployment module 144, a reporting module 146 and a bot creation module 143. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human workers 123, or by other users, for example, for administration purposes.

The calibration processor 142 can, for each of the tenant systems 110, in collaboration with the calibration agents 130, monitor execution of user-executed processes by the managed bots 120 and/or the human workers 123. Operation of the calibration processor 142 and the calibration agents 130 will be described in greater detail relative to FIG. 2.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information from the calibration processor 142 to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can generate regular or on-demand reports related to the managed bots 120 and the managed human workers 123. In various cases, these reports can provide a snapshot of some or all of the managed bots 120 and the managed human workers 123 (e.g., regarding performance gaps as described further below). The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, data collected from the managed bots 120, the human workers 123 or the computer systems 122, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
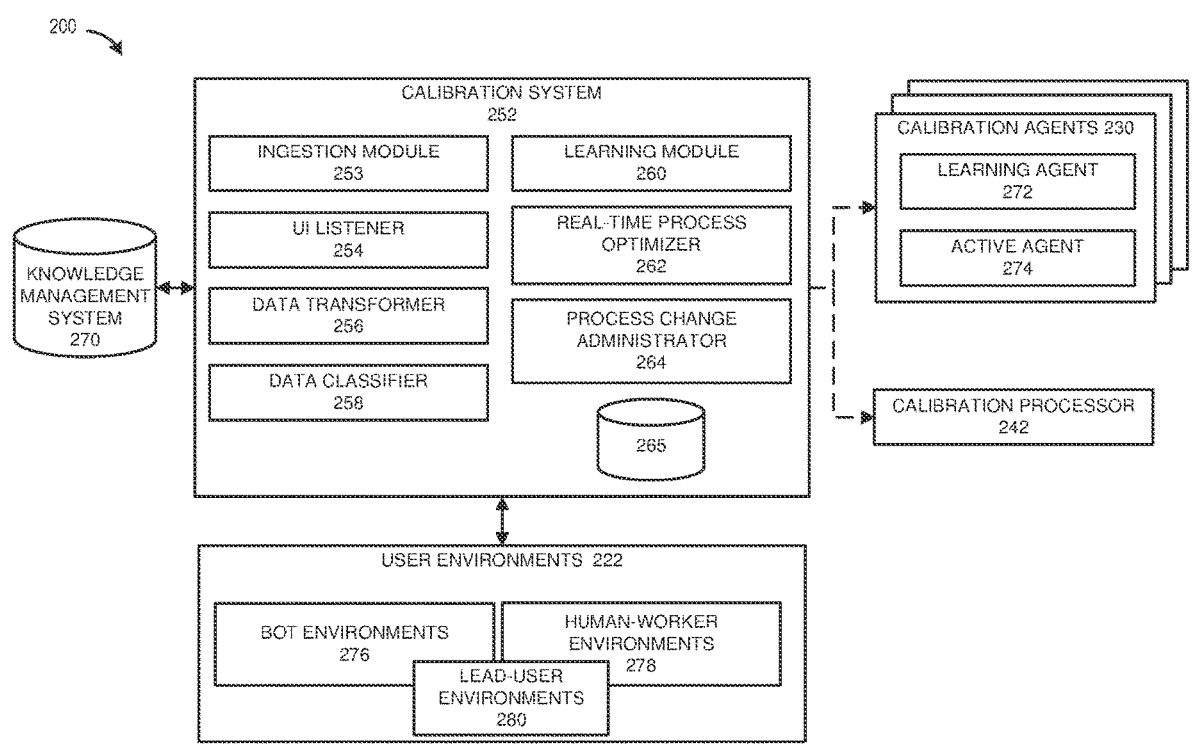
FIG. 2 illustrates an example of an environment for a calibration system for a user-executed process.

FIG. 2 illustrates an example of an environment 200 for a calibration system 252 for a user-executed process. Although the environment 200 is described relative to a single user-executed process for illustrative purposes, it should be appreciated that the system 100 of FIG. 1, for example, can support a plurality of such environments for a plurality of user-executed processes. The environment 200 includes the calibration system 252, a knowledge management system 270, calibration agents 230, a calibration processor 242 and user environments 222.

The user environments 222 can correspond to user environments provided, for example, by the computer systems 122 of FIG. 1. As illustrated, the user environments 222 include bot environments 276, human-worker environments 278, and lead-user environments 280. The bot environments 276 are generally operated by bots such as the managed bots 120 of FIG. 1. The human-worker environments 278 are generally operated by human workers such as the managed human workers 123 of FIG. 1.

In general, the lead-user environments 280 are a subset of the user environments 222 that serve, for example, as a basis for incremental learning. In some embodiments, the lead-user environments 280 can include, for example, a subset of the human-worker environments 278 corresponding to specific human workers who have been designated as such, for example, due to their human expertise. However, generally speaking, the lead-user environments 280 can include some or all of the bot environments 276, some or all of the human-worker environments 278, or a selected combination of certain of the bot environments 276 and certain of the human-worker environments 278.

The calibration system 252 is configured to calibrate different types of users, such as the managed bots 120 and the managed human workers 123 of FIG. 1, for execution of the user-executed process. The calibration system 252 includes an ingestion module 253, a UI listener 254, a data transformer 256, a data classifier 258, a learning module 260, a real-time process optimizer 262, and a process change administrator 264. As illustrated, in various embodiments, operation of the calibration system 252 can be distributed between the calibration agents 130 and the calibration processor 142 in any suitable fashion. In general, the calibration agents 230 and the calibration processor 242 can each operate as described relative to the calibration agents 130 and the calibration processor 142, respectively, of FIG. 1.

The knowledge management system 270 can include data related to how the user-executed process is executed. In various examples, the knowledge management system 270 can include, for example, process documents, knowledge base files, system alerts, on-screen tips, bite-sized training materials and/or help files in video, audio, image and document formats. The data of the knowledge management system 270 can be received or retrieved from other users (e.g., bots and/or human workers) and/or from systems used for training, for example, new human workers. Document formats can include, for example, one or more of Portable Document Format (PDF), Microsoft (MS) Office formats including MS Word, MS PowerPoint (PPT) and MS Excel, and image formats including Joint Photographic Experts Group (JPEG), Portable Network Graphics (PNG) and Graphic Interchange Format (GIF). The knowledge management system 270 can be stored, for example, in the one or more data stores 150 of FIG. 1.

The ingestion module 253 is operable to collect, or ingest, the data of the knowledge management system 270. In various embodiments, the data can be indexed and stored, for example, in a data store 265. As will be described in greater detail below, the collected or ingested data from the knowledge management system 270 can be used, in part, to execute machine learning relative to the user-executed process. In various embodiments, the machine learning, once complete, can reduce or eliminate a need for users to directly access and refer to documents or other data in the knowledge management system 270.

The UI listener 254 monitors and records UI activity in the user environments 222. For example, the UI listener 254 can periodically or continuously receive a live screen output of each of the user environments 222 and record UI activity data based thereon. In certain embodiments, the live screen output can include, for example, one or more UIs that present a data-entry screen for users to perform data entry.

In various embodiments, a given data-entry screen may be, or be included as part of, a text terminal, a browser window, a container window that encloses other windows or widgets, message windows or dialog boxes, a child window opening as a result of user activity in a parent window (e.g., a popup window), a combination of the foregoing and/or the like. Each data-entry screen can include, for example, various control elements with which a user interacts to perform data entry. These control elements can include, for example, radio buttons, check boxes, toggle switches, sliders, list boxes, spinners that step through ranges of values, drop-down lists, menus, menu bars, toolbars, ribbons, text boxes, combo boxes (e.g., combining drop-down list or list box and a text box), icons, tables, tabs, scrollbars, any other suitable UI feature, combinations of the foregoing and/or the like. Some or all of these control elements may be associated, for example, with text labels or graphical icons, depending on a type of interface.

In an example, the UI listener 254 can use image-recognition technology, optical character recognition (OCR) technology and/or the like to identify individual control elements of the type described above along with specific data entered thereby (e.g., selections, text entries, or the like). The UI listener 254 can further identify a location of each individual control element within each UI (e.g., using coordinates). According to this example, the UI listener 254 can generate and/or record, for example, data related to the individual control elements, including data entered thereby and their location within each UI.

In another example, the UI listener 254 can detect UI events in a given UI in relation to the live screen output. As described previously, the UI events can correspond to input from various input devices such as a keyboard, mouse, microphone, touchscreen, combinations of the foregoing and/or the like. Thereafter, the UI listener 254 can determine target application(s) for each detected UI event(s). Generally, the target application(s) are executing in a respective computing environment and provide at least part of a UI with which a given user interacts. The target application(s) may include, for example, an application to which the detected UI event(s) are directed, for example, as a result of being in focus or as a result of providing a UI object, component or control element to which the detected UI event(s) relate. Examples include, but are not limited to, an application that provided a text box for receiving text (keyboard event) and an application that is clicked (mouse click event).

The data transformer 256 can transform data obtained or collected by the ingestion module 253 and/or the UI listener 254. In certain embodiments, the ingestion module 253 and/or the UI listener 254 collects various data of the type above, which data may be referred to generically as heterogeneous transaction data. Such heterogeneous transaction data may exist or be compiled in different formats. In various embodiments, the data transformer 256 can homogenize such data into homogeneous transaction data. For example, with reference to the data produced by the UI listener 254, the information related to the individual control elements can be resolved to specific data fields to which the control elements relate (e.g., with a homogenized data-field name and value format). The previously mentioned locations of such control elements can thereby refer to locations of these data fields, sometimes referred to herein as data-field locations. Continuing this example, in certain embodiments, the data transformer 256 can create a dataset representing the live screen output and/or a UI therein, where the dataset represents the homogeneous transaction data. In some cases, the dataset can be in a structured format that is represented, for example, using XML.

The data classifier 258 classifies, using a machine learning algorithm, the homogeneous transaction data based on various parameters such as, for example, data fields and values. In various cases, the data classifier 258 can classify using, for example, artificial neural networks, decision trees, ensemble learning, and/or the like. The classified data can be stored, for example, in the data store 265.

The learning module 260 can initially create a plurality of machine-learning models based on an initial set of classified data, where each machine-learning model can correspond to a specific target UI, a user-executed process, and/or a step or task of a user-executed process. Thereafter, the learning module 260 can facilitate incremental learning based on new classified data from the data classifier 258. For example, the learning module 260 can select a target UI or process steps for the new classified data and provide the new classified data as input data for the corresponding machine-learning model(s). In various embodiments, the learning module 260 can thereby learn and associate UI data with specific steps or tasks of the user executed process as represented, for example, in an instruction set similar to the instruction set 126 of FIG. 1. For each machine-learning model, the learning module 260 can evaluate readiness to assist in process optimization, for example, through an evaluation of confidence threshold or the like. In various embodiments, the learning module 260 can restrict learning, for example, to classified data originating from user activity in the lead-user environments 280.

The real-time process optimizer 262 uses the plurality of machine-learning models of the learning module 260 to monitor execution of the user-executed process in the user environments 222. In some aspects, the real-time process optimizer 262 continuously or periodically receives new classified data for individual user environments of the user environments 222 as real-time UI activity data. The real-time process optimizer 262 uses the real-time activity data to track process execution, identify process discrepancies, and provide process guidance. In various embodiments, the real-time process optimizer 262 can execute functionality for individual ones of the user environments 222 and/or on an aggregate level across all of the user environments 222 or any subset thereof.

In various embodiments, with respect to tracking process execution for an individual user environment, the real-time process optimizer 262 can correlate the real-time UI activity data to a plurality of steps of the user-executed process as represented, for example, in an instruction set similar to the instruction set 126 of FIG. 1. In an example, the real-time process optimizer 262 can compare the real-time UI activity data to UI data associated with the plurality of steps of the user-executed process, match the real-time UI activity data to one or more steps of the user-executed process, and update a tracking status of the user-executed process (e.g., which step or task has been completed or is currently being executed).

In various embodiments, with respect to identifying process discrepancies, the real-time process optimizer 262 can identify anomalies in the real-time UI activity data as process discrepancies. In general, a process discrepancy can be any UI activity data or process performance that is anomalous or irregular for the user-executed process, for example, based on a machine-learning model, rules, or other logic for the user-executed process. Irregularity can be determined in any suitable fashion such as based on a confidence score or other metric. In some embodiments, the real-time process optimizer 262 can identify missed steps by detecting that one or more tasks steps have been, or are being, performed, while one or more prior steps or tasks have not been performed. The one or more prior steps can be considered missed steps.

In various embodiments, the real-time process optimizer 262 can detect a process discrepancy as a new process scenario for triggering change management. In various embodiments, a new process scenario can be any detected situation that changes how the user-executed process is performed. In some cases, the real-time process optimizer 262 can detect a UI change as a new process scenario. For example, as mentioned previously, the real-time process optimizer 262 can compare the real-time UI activity data to UI data associated with the plurality of steps of the user-executed process and match the real-time UI activity data to one or more steps of the user-executed process. In some embodiments, the real-time process optimizer 262 can thereafter determine that the UI for a particular step has changed, for example, as a result of not having the same control elements in the same locations within the UI as compared to the UI data associated with the particular step. In an example, a particular data field, such as a password data field, may have been relocated within the UI. According to this example, the UI change embodied by the relocated data field can be detected as a new process scenario. In some embodiments, a given UI change may not be detected as a new process scenario until such change is identified in a threshold number of user environments and/or a threshold number of times.

In some cases, the real-time process optimizer 262 can detect a change to the user-executed process itself as a new process scenario. For example, as mentioned previously, the real-time process optimizer 262 can detect process irregularity, for example, specific user environments, such as in the lead-user environments 280, as a new process scenario. In an example, a task or other user action that does not match to a step of the user-executed process may be detected as a new step. In another example, a task or other user action that appears to be performed out of order may be detected as a step reordering. In yet another example, a new UI for which the UI activity data does not match to any step of the user-executed process may be detected as a new or added step or series of steps. In still another example, a task or step that is no longer performed may be detected as a step that may be omitted or deleted. In some embodiments, a given change to the user-executed process may not be detected as a new process scenario until such change is identified in a threshold number of user environments and/or a threshold number of times.

In various embodiments, with respect to providing process guidance, the real-time process optimizer 262 can generate a recommended next step or other recommendation, for example, based on a machine-learning model for the user-executed process. The recommended next step or other recommendation can be determined based on a confidence score or other metric. In some embodiments, the next step or recommendation can be presented in a respective user environment of the user environments 222. In another example, the real-time process optimizer 262 can validate, for example, user input in data fields. The validation can be performed based on a confidence score or other metric. Failed validation can be indicated, for example, as an error in the respective user environment of the user environments 222. In various embodiments, real-time process-guidance functionality can be particularly advantageous for human workers such as the managed human workers 123 of FIG. 1. In certain embodiments, the need to access the knowledge management system 270 can be reduced or eliminated.

As mentioned above, in various embodiments, the real-time process optimizer 262 can execute functionality on an aggregate level across all of the user environments 222 or any subset thereof, where all data used or generated thereby can be stored in the data store 265. In certain embodiments, performance of the user-executed process by different users and sets of users can be compared for purposes of identifying performance gaps. Performance can be measured based on any suitable metric such as, for example, errors, process discrepancies, time to complete a transaction (e.g., in terms of mean, median, or the like), total number of completed transactions, a composite of the foregoing and/or the like. In various embodiments, performance can be measured for a user or for a set of users. According to this example, such performance can be compared to a baseline, where sufficient deviation from the baseline constitutes a performance gap. In an example, the baseline can be a predefined baseline with threshold values for the performance under consideration. In another example, the baseline can be a statistical baseline that is compiled across all users or for a particular set of users such as, for example, lead users operating the lead-user environments 280, bots operating the bot environments 276, human workers operating the human-worker environments 278, and/or the like. In various embodiments, performance gaps can be identified for individual users relative to the lead users, bots relative to the lead users, human workers relative to bots, and/or the like.

The process change administrator 264 can interact with the real-time process optimizer 262 and/or other components to automatically address new process scenarios. In various embodiments, the process change administrator 264 can determine, as appropriate, new bot logic for the new process scenario and cause the new bot logic to be implemented, for example, by the managed bots 120 which execute the user-executed process. The new bot logic can be, for example, an update to the instruction set for the user-executed process. In an example, the process change administrator 264 can indicate a new location of a particular data field such as a password data field. In another example, the process change administrator 264 can add a new step such as, for example, clicking a "next" button that was not previously present. In yet another example, the process change administrator 264 can reorder steps represented in the instruction set. In various embodiments, process change administrator 264 can update the bots with the new bot logic, for example, by automatically creating an updated version of the same bots (or creating new bots) and deploying or re-deploying such bots.

The calibration agents 230 can execute in the user environments 222 and can include a learning agent 272 and an active agent 274. In various embodiments, the learning agent 272 of the calibration agents 230 can include agent-level functionality related to learning (e.g., agent-level functionality of the UI listener 254 and the learning module 260). In various embodiments, the active agent 274 of the calibration agents 230 can include agent-level functionality related to process optimization (e.g., agent-level functionality of the real-time process optimizer 262). The active agent 274 can provide notifications, for example, in the form of popups, dashboard updates, or the like. Such notifications can relate, for example, to process discrepancies, errors, recommendations, failed validations, or the like as described above relative to the real-time process optimizer 262.

Figure 3:
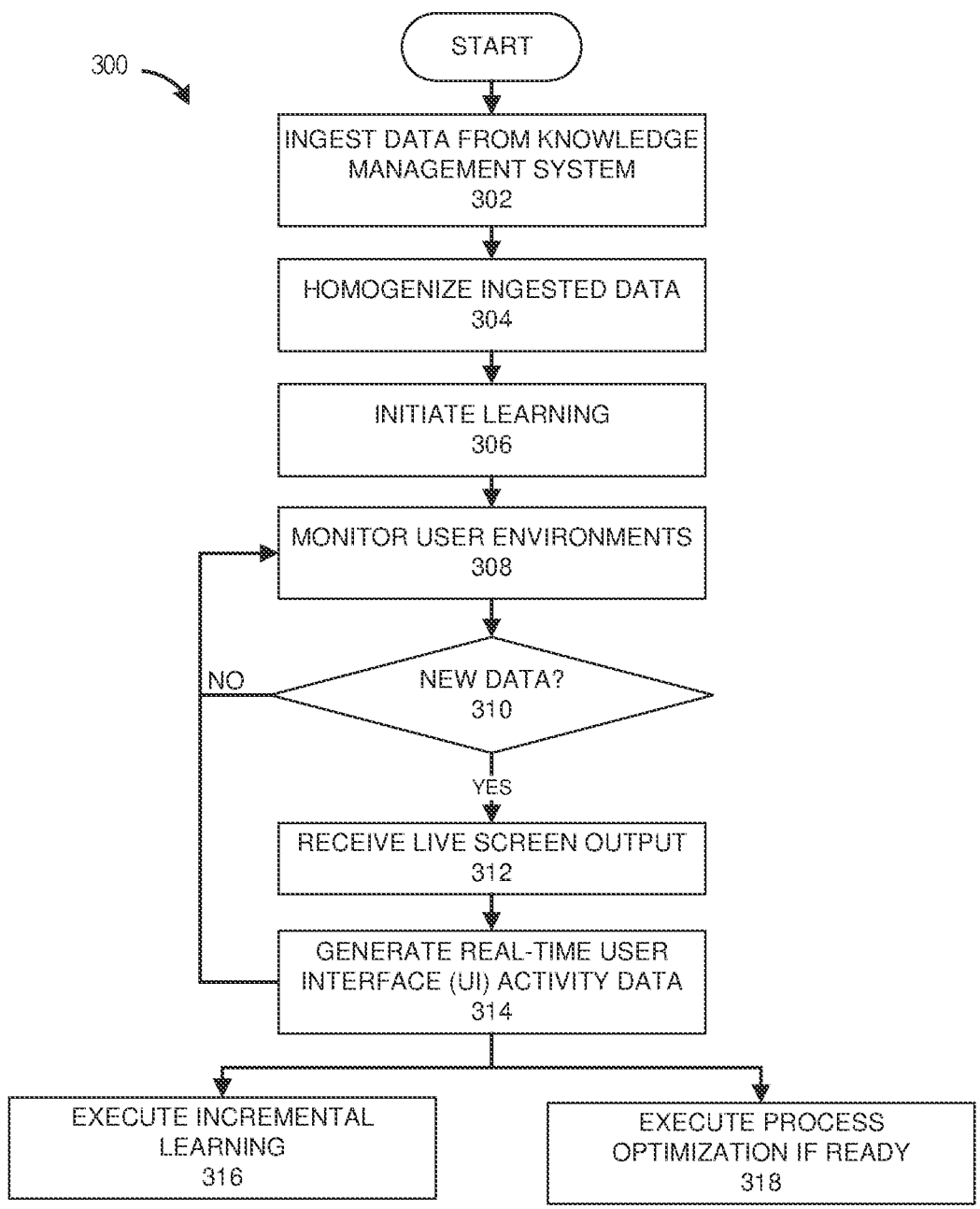
FIG. 3 illustrates an example of a process for operating a calibration system.

FIG. 3 illustrates an example of a process 300 for operating a calibration system such as the calibration system 252 of FIG. 2. In certain embodiments, the process 300 can be implemented by any system that can process data. Although any number of systems, in whole or in part, can implement the process 300, to simplify discussion, the process 300 will be described in relation to particular components shown and described relative to FIGS. 1-2.

At block 302, the ingestion module 253 ingests data of the knowledge management system 270, for example, in the fashion described above relative to FIG. 2. At block 304, the data transformer 256 transforms the ingested data, which may be heterogeneous transaction data, into homogeneous transaction data. At block 306, the learning module 260 initiates learning of the user-executed process via the homogeneous transaction data. An example of learning will be described relative to FIG. 4.

At block 308, the UI listener 254 monitors, for example, some or all of the user environments 222. The UI listener 254 can include, for example, a listening component in each of the calibration agents 230 for each of the user environments 222. In an example, such listening component can reside in the learning agent 272 of each of the calibration agents 230. At decision block 310, the UI listener 354 determines whether there is new live screen output for processing. If not, the process 300 returns to the block 308 and executes as described previously. Otherwise, if it is determined at the decision block 310 that there is a new live screen output for processing, at block 312, the UI listener 254 receives the live screen output.

At block 314, the calibration system 252 generates real-time UI activity data based, at least in part, on the live screen output. In certain embodiments, the block 314 can include, for example, the UI listener 254 recording data regarding UI activity, the data transformer 256 treating the recorded data as heterogeneous transaction data and transforming it into homogeneous transaction data as described previously, such that the generated real-time UI activity data is the homogeneous transaction data. From block 314, the process 300 can, in parallel, proceed to blocks 316 and 318 while also returning to block 308 to continue monitoring the user environments 222 as described previously.

At block 316, the learning module 260 executes incremental learning using the generated real-time UI activity data. In some embodiments, for purposes of learning, the learning module 260 may rely only upon data originating from the lead-user environments 280. An example of learning will be described relative to FIG. 4. At block 318, the real-time process optimizer 262 executes process-monitoring and optimization functionality to the extent, for example, it is ready to do so. In various embodiments, the learning module 260 can evaluate readiness to assist in process optimization, for example, through an evaluation of confidence threshold or the like. In various embodiments, the process 300 can continue until terminated by an administrator or other user or until other suitable stop criteria is satisfied.

Figure 4:
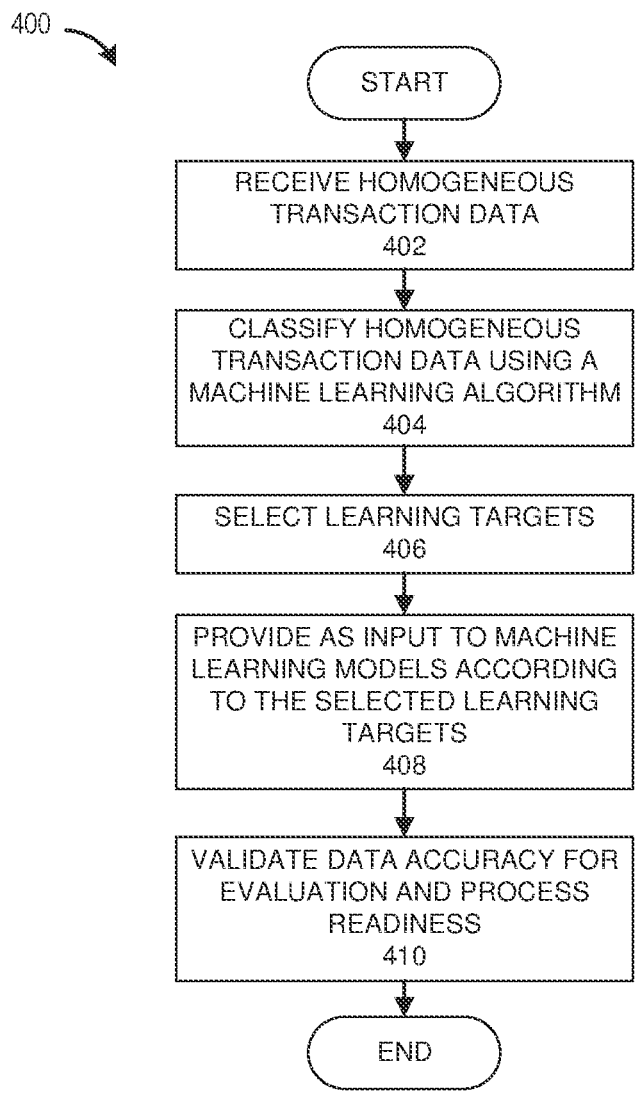
FIG. 4 illustrates an example of a process for learning in a calibration system.

FIG. 4 illustrates an example of a process 400 for learning in a calibration system such as the calibration system 252 of FIG. 2. In various embodiments, the process 400 can be executed, for example, as all or part of the blocks 306 and 316 of FIG. 3. In certain embodiments, the process 400 can be implemented by any system that can process data. Although any number of systems, in whole or in part, can implement the process 400, to simplify discussion, the process 400 will be described in relation to particular components shown and described relative to FIGS. 1-2.

At block 402, the learning module 260 receives homogeneous transaction data. In various embodiments, the homogeneous transaction data can be, for example, homogenized ingested data of the type described relative to the block 304 of FIG. 3, real-time UI activity data of the type described relative the block 312 of FIG. 3, and/or the like. At block 404, the learning module 260 causes the data classifier 258 to classify the homogeneous transaction data based on various parameters such as, for example, data fields and values. In various cases, the data classifier 258 can classify using, for example, artificial neural networks, decision trees, ensemble learning, and/or the like. The classified data can be stored, for example, in the data store 265.

At block 406, the learning module 260 selects learning targets. In various embodiments, in an initial iteration of the process 400 (e.g., as part of the block 306 of FIG. 3), the learning module 260 can initially create a plurality of machine-learning models based on the classified data, where each machine-learning model can correspond to a specific target UI, a user-executed process, and/or a step or task of a user-executed process. Thereafter, the learning module 260 can select a target UI or process steps for the classified data.

At block 408, the learning module 260 provides the classified data as input data for the learning targets, which are the corresponding learning machine-learning model(s). In various embodiments, the learning module 260 can thereby learn and associate UI data with specific steps or tasks of the user executed process as represented, for example, in an instruction set similar to the instruction set 126 of FIG. 1.

At block 410, for each machine-learning model, the learning module 260 can evaluate readiness to assist in process optimization, for example, through an evaluation of confidence threshold or the like. In various embodiments, the learning module 260 can utilize, for example, the classified data originating from user activity in the lead-user environments 280. In various embodiments, process readiness can be a prerequisite to process-optimization features that may be performed, for example, as part of the block 318 of FIG. 3. After block 410, the process 400 ends.

Figure 5:
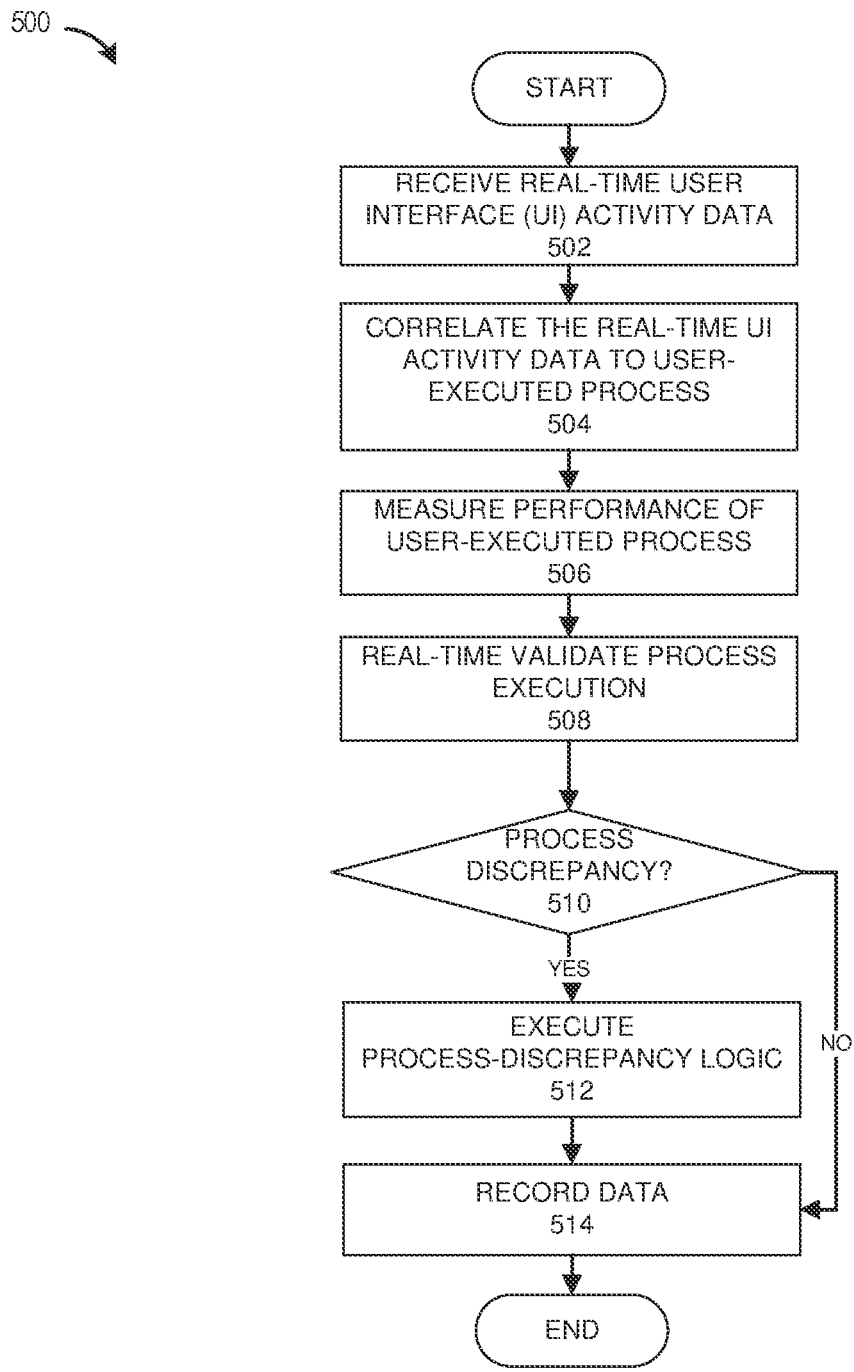
FIG. 5 illustrates an example of a process for real-time optimizing a user-executed process.

FIG. 5 illustrates an example of a process 500 for real-time optimizing a user-executed process in a calibration system such as the calibration system 252 of FIG. 2. In various embodiments, the process 500 can be executed, for example, as all or part of the block 318 of FIG. 3. In certain embodiments, the process 500 can be implemented by any system that can process data. Although any number of systems, in whole or in part, can implement the process 500, to simplify discussion, the process 500 will be described in relation to particular components shown and described relative to FIGS. 1-2.

At block 502, the real-time process optimizer 262 receives real-time UI activity data that has been generated, for example, as described relative to the block 314 of FIG. 3. At block 504, the real-time process optimizer 262 correlates the real-time UT activity data to individual steps of the user-executed process as described, for example, relative to FIG. 2. At block 506, the real-time process optimizer 262 measures performance of the user-executed process as described, for example, relative to FIG. 2.

At block 508, the real-time process optimizer 262 real-time validates execution of the user-executed process. The block 508 can include, for example, identifying process discrepancies (e.g., including detecting new process scenarios), providing process guidance, aggregate optimization features (e.g., including identifying or detecting performance gaps), combinations of the foregoing and/or the like. At decision block 510, the real-time process optimizer 262 determines whether a process discrepancy has been identified, for example, as a result of the real-time validation at the block 508. If not, the process 500 proceeds directly to block 514. Otherwise, if it is determined at the decision block 510 that a process discrepancy has been identified, the process 500 proceeds to block 512.

At block 512, the real-time process optimizer 262 executes process-discrepancy logic. As described relative to FIG. 2, the execution of the process-discrepancy logic can include, for example, causing the active agent 274 of a corresponding one of the calibration agents 230 to provide notify a user (e.g., a human worker), for example, in the form of popups, dashboard updates, or the like. In other examples, the process-discrepancy logic can result in a notification to supervisory users or administrators. In the case of a new process scenario, the process-discrepancy logic can trigger execution of the process change administrator 264. At block 514, the real-time process optimizer 262 can record any data used or generated during the process 500, for example, in the data store 265. After block 514, the process 500 ends.

Figure 6:
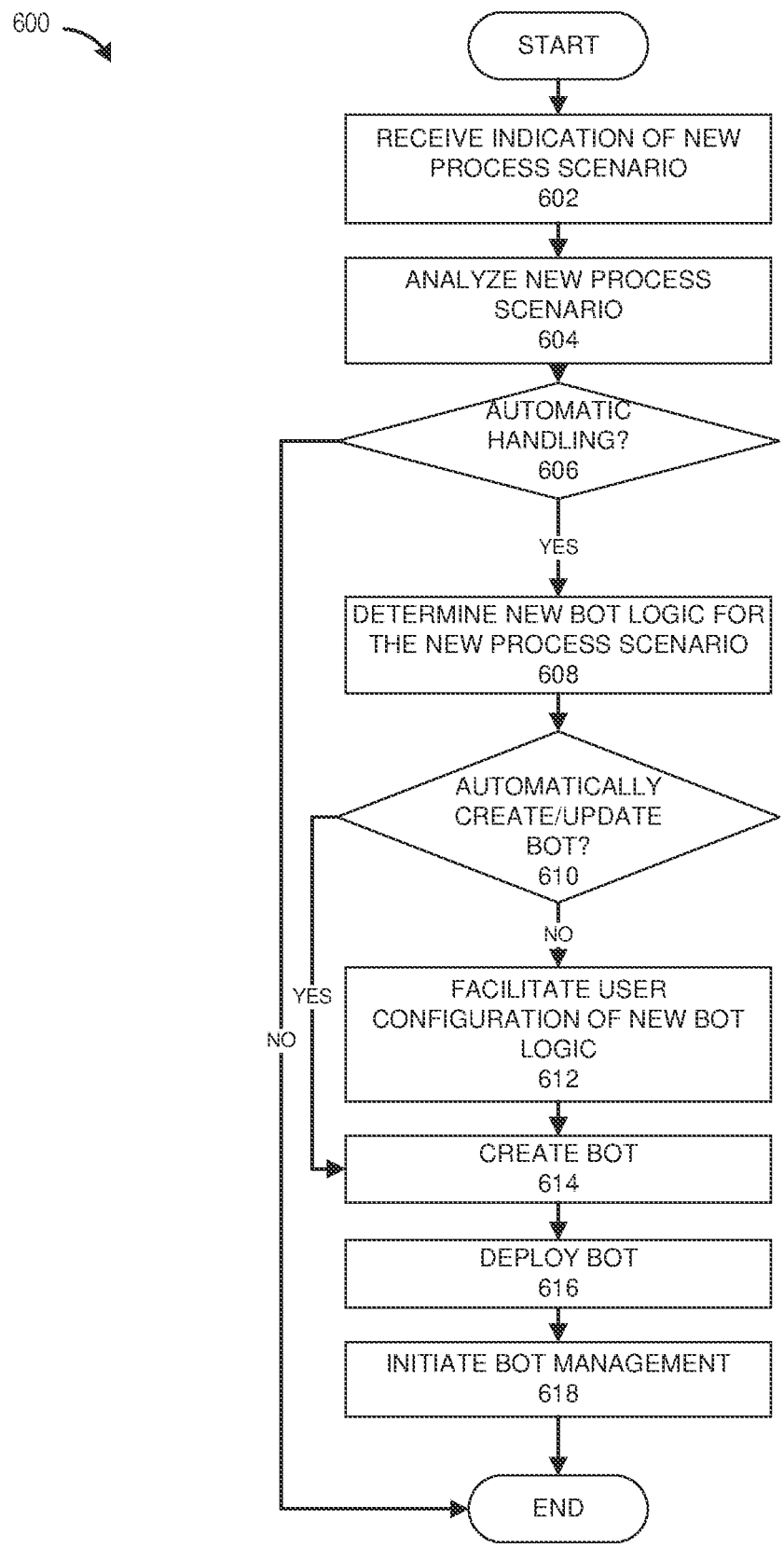
FIG. 6 illustrates an example of a process for addressing new process scenarios in a calibration system.

FIG. 6 illustrates an example of a process 600 for addressing new process scenarios in a calibration system such as the calibration system 252 of FIG. 2. In various embodiments, the process 600 can be executed, for example, during operation of the process 300 of FIG. 3 and/or the process 500 of FIG. 5. In certain embodiments, the process 600 can be implemented by any system that can process data. Although any number of systems, in whole or in part, can implement the process 600, to simplify discussion, the process 600 will be described in relation to particular components shown and described relative to FIGS. 1-2.

At block 602, the process change administrator 264 receives an indication of a new process scenario. In various embodiments, the block 602 can be triggered, for example, by the real-time process optimizer 262 as part of the block 512 of FIG. 5. At block 604, the process change administrator 264 analyzes the new process scenario. The block 604 can include, for example, determining the nature of the new process scenario and evaluating whether it is one that can be automatically handled by the process change administrator 264. In an example, relocations of data fields may be capable of being automatically handled. In other examples, changes to steps can be capable of being automatically handled. In an example, a reordering of steps can be detected and automatically handled. In another example, a detected additional step (e.g., from a lead user) such as, for example, an additional button press, may be capable of being automatically handled. In similar fashion, a detected deletion or omission of a step (e.g., from a lead user) such as, for example, an unneeded button press, may be capable of being automatically handled. In various embodiments, new process scenarios that may be handled can be configurable and specified in settings, for example, in the data store 265.

At decision block 606, the process change administrator 264 determines whether the new process scenario will be automatically handled by the process change administrator 264. If a negative determination is made at the decision block 606, the process 600 can end. If an affirmative determination is made at the decision block 606, the process 600 proceeds to block 608.

At block 608, the process change administrator 264 determines new bot logic for the new process scenario. The new bot logic can be, for example, an update to the instruction set for the user-executed process. In an example, the process change administrator 264 can indicate a new location of a particular data field such as a password data field. In another example, the process change administrator 264 can add a new step such as, for example, clicking a "next" button that was not previously present. In yet another example, the process change administrator 264 can reorder steps represented in the instruction set. In still another example, the process change administrator 264 can delete a step that is no longer to be performed. In various embodiments, the process change administrator 264 can thereafter cause one or more of the managed bots 120 that perform the user-executed process to implement the new bot logic. The process change administrator 264 can cause this implementation by executing, for example, blocks 610-618, which blocks are described below.

At decision block 610, the bot creation module 143 determines whether to proceed with automatic bot creation. Creation, as used here, can include updating or reconfiguring an existing bot. In some embodiments, the determination at the decision block 412 can be based, at least in part, on a determined complexity. In these embodiments, the determination can involve the bot creation module 143 ascertaining whether a determined complexity satisfies configurable criteria for automatic bot creation. For example, the configurable criteria can implement a rule that the bot creation module 143 can only proceed with automatic bot creation for complexities of certain categories (e.g., low or medium) or that have sufficiently low complexity metrics or numbers (e.g., 7 or lower).

If it is determined at the decision block 610 to proceed with automatic bot creation, the process 600 proceeds to block 616. Otherwise, if a negative determination is reached at the decision block 610, the process proceeds to block 614. Further, in some embodiments, automatic bot creation can be allowed to proceed in every instance. In these embodiments, blocks 410-412 can be omitted and the process can proceed directly from block 608 to 614.

At block 612, the bot creation module 143 can facilitate user configuration of the instruction set. From block 612, the process 400 proceeds to block 614. At block 614, the bot creation module 143 proceeds with bot creation using the updated instruction set as potentially edited at the block 612. For example, the bot creation module 143 can adapt or translate the instruction set, as necessary, for a particular RPA platform of the RPA platforms 124 of FIG. 1. In some embodiments, there may not be any further action required of the bot creation module 143 beyond the instruction set which was generated at the block 608 and potentially edited at the block 612. In these embodiments, the block 614 may be omitted.

At block 616, the bot manager 145 causes the bot deployment module 144 to deploy the bot on a selected RPA platform, for example, of the RPA platforms 124 of FIG. 1. Deployment, as used here, can include re-deployment of an existing bot as updated with the updated instruction set. As part of the block 616, the bot deployment module 144 can cause the selected RPA platform to execute the bot, thereby executing a user-executed process as a robotic process. At block 618, the bot manager 145 initiates bot management, for example, by monitoring the bot as one of the managed bots 120 and/or by publishing a configuration interface that enables management of the bot. After block 618, the process 600 ends.

Figure 7:
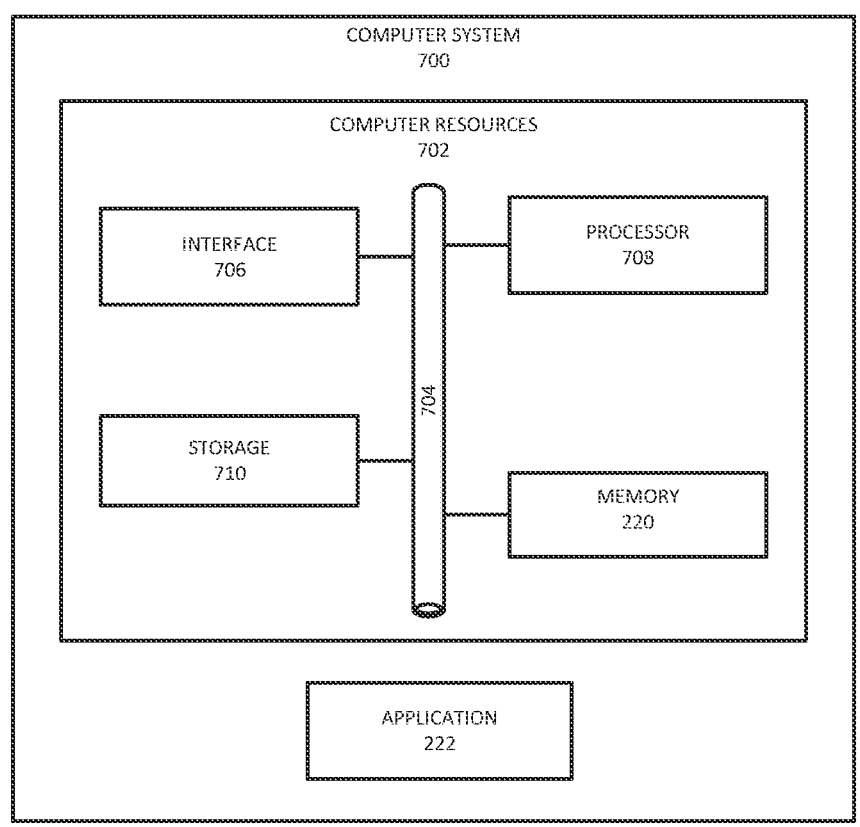
FIG. 7 illustrates an example of a computer system.

FIG. 7 illustrates an example of a computer system 700 that, in some cases, can be representative, for example, of the central management system 140, the RPA platforms 124, the tenant systems 110, the user systems 160 and/or a module or sub-component of the foregoing. The computer system 700 includes an application 722 operable to execute on computer resources 702. The application 722 can be, for example, any of the systems or modules illustrated in FIG. 1 or FIG. 2. In particular embodiments, the computer system 700 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 700 may comprise any suitable physical form, configuration, number, type and/or layout. As an example, and not by way of limitation, the computer system 700 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 700 may include one or more computer systems; be unitary or distributed; span multiple locations; span multiple machines; or reside in a cloud, which may include one or more cloud components in one or more networks.

In the depicted embodiment, the computer system 700 includes a processor 708, memory 720, storage 710, interface 706, and bus 704. Although a particular computer system is depicted having a particular number of particular components in a particular arrangement, this disclosure contemplates any suitable computer system having any suitable number of any suitable components in any suitable arrangement.

Processor 708 may be a microprocessor, controller, or any other suitable computing device, resource, or combination of hardware, software and/or encoded logic operable to execute, either alone or in conjunction with other components, (e.g., memory 720), the application 722. Such functionality may include providing various features discussed herein. In particular embodiments, processor 708 may include hardware for executing instructions, such as those making up the application 722. As an example, and not by way of limitation, to execute instructions, processor 708 may retrieve (or fetch) instructions from an internal register, an internal cache, memory 720, or storage 710; decode and execute them; and then write one or more results to an internal register, an internal cache, memory 720, or storage 710.

In particular embodiments, processor 708 may include one or more internal caches for data, instructions, or addresses. This disclosure contemplates processor 708 including any suitable number of any suitable internal caches, where appropriate. As an example, and not by way of limitation, processor 708 may include one or more instruction caches, one or more data caches, and one or more translation lookaside buffers (TLBs). Instructions in the instruction caches may be copies of instructions in memory 720 or storage 710 and the instruction caches may speed up retrieval of those instructions by processor 708. Data in the data caches may be copies of data in memory 720 or storage 710 for instructions executing at processor 708 to operate on; the results of previous instructions executed at processor 708 for access by subsequent instructions executing at processor 708, or for writing to memory 720, or storage 710; or other suitable data. The data caches may speed up read or write operations by processor 708. The TLBs may speed up virtual-address translations for processor 708. In particular embodiments, processor 708 may include one or more internal registers for data, instructions, or addresses. Depending on the embodiment, processor 708 may include any suitable number of any suitable internal registers, where appropriate. Where appropriate, processor 708 may include one or more arithmetic logic units (ALUs); be a multi-core processor; include one or more processors 708; or any other suitable processor.

Memory 720 may be any form of volatile or non-volatile memory including, without limitation, magnetic media, optical media, random access memory (RAM), read-only memory (ROM), flash memory, removable media, or any other suitable local or remote memory component or components. In particular embodiments, memory 720 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 720 may include one or more memories 720, where appropriate. Memory 720 may store any suitable data or information utilized by the computer system 700, including software embedded in a computer readable medium, and/or encoded logic incorporated in hardware or otherwise stored (e.g., firmware). In particular embodiments, memory 720 may include main memory for storing instructions for processor 708 to execute or data for processor 708 to operate on. In particular embodiments, one or more memory management units (MMUs) may reside between processor 708 and memory 720 and facilitate accesses to memory 720 requested by processor 708.

As an example, and not by way of limitation, the computer system 700 may load instructions from storage 710 or another source (such as, for example, another computer system) to memory 720. Processor 708 may then load the instructions from memory 720 to an internal register or internal cache. To execute the instructions, processor 708 may retrieve the instructions from the internal register or internal cache and decode them. During or after execution of the instructions, processor 708 may write one or more results (which may be intermediate or final results) to the internal register or internal cache. Processor 708 may then write one or more of those results to memory 720. In particular embodiments, processor 708 may execute only instructions in one or more internal registers or internal caches or in memory 720 (as opposed to storage 710 or elsewhere) and may operate only on data in one or more internal registers or internal caches or in memory 720 (as opposed to storage 710 or elsewhere).

In particular embodiments, storage 710 may include mass storage for data or instructions. As an example, and not by way of limitation, storage 710 may include a hard disk drive (HDD), a floppy disk drive, flash memory, an optical disc, a magneto-optical disc, magnetic tape, or a Universal Serial Bus (USB) drive or a combination of two or more of these. Storage 710 may include removable or non-removable (or fixed) media, where appropriate. Storage 710 may be internal or external to the computer system 700, where appropriate. In particular embodiments, storage 710 may be non-volatile, solid-state memory. In particular embodiments, storage 710 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 710 may take any suitable physical form and may comprise any suitable number or type of storage. Storage 710 may include one or more storage control units facilitating communication between processor 708 and storage 710, where appropriate.

In particular embodiments, interface 706 may include hardware, encoded software, or both providing one or more interfaces for communication (such as, for example, packet-based communication) among any networks, any network devices, and/or any other computer systems. As an example, and not by way of limitation, communication interface 706 may include a network interface controller (NIC) or network adapter for communicating with an Ethernet or other wire-based network and/or a wireless NIC (WNIC) or wireless adapter for communicating with a wireless network.

Depending on the embodiment, interface 706 may be any type of interface suitable for any type of network for which computer system 700 is used. As an example, and not by way of limitation, computer system 700 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 700 may include any suitable interface 706 for any one or more of these networks, where appropriate.

In some embodiments, interface 706 may include one or more interfaces for one or more I/O devices. One or more of these I/O devices may enable communication between a person and the computer system 700. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 706 for them. Where appropriate, interface 706 may include one or more drivers enabling processor 708 to drive one or more of these I/O devices. Interface 706 may include one or more interfaces 706, where appropriate.

Bus 704 may include any combination of hardware, software embedded in a computer readable medium, and/or encoded logic incorporated in hardware or otherwise stored (e.g., firmware) to couple components of the computer system 700 to each other. As an example, and not by way of limitation, bus 704 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 704 may include any number, type, and/or configuration of buses 704, where appropriate. In particular embodiments, one or more buses 704 (which may each include an address bus and a data bus) may couple processor 708 to memory 720. Bus 704 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 708 (such as, for example, one or more internal registers or caches), one or more portions of memory 720, one or more portions of storage 710, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.,," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of real-time process monitoring, the method comprising, by a computer system:
    initiating monitoring of user interface (UI) activity in a plurality of user environments in which a user-executed process is performed, wherein the user-executed process is defined in a stored instruction set that identifies a plurality of steps of the user-executed process, and wherein the plurality of user environments comprise a first environment operated by a human worker and a second environment operated by a bot;

responsive to the initiating, detecting a new process scenario for the user-executed process, the new process scenario comprising a UI change in at least one of the plurality of user environments, the detecting comprising:
  comparing real-time UI activity data from at least one user environment of the plurality of user environments to UI data associated with the plurality of steps of the user-executed process;
  matching the real-time UI activity data to a step of the user-executed process; and
  responsive to the matching, determining that a UI for the step has changed;
determining new bot logic for the new process scenario; and
causing the bot to implement the new bot logic.

2. The method of claim 1, wherein the determining the new bot logic is performed responsive to a determination that the new process scenario can be automatically handled.

3. The method of claim 1, wherein the determining the new bot logic comprises updating the stored instruction set for the user-executed process.

4. The method of claim 1, wherein the determining that the UI for the step has changed is based, at least in part, on a determination that a particular UI in the at least one user environment does not have the same control elements in the same locations as compared to the UI data associated with the step.

5. The method of claim 1, comprising:
  detecting a second new process scenario for the user-executed process;
  determining second new bot logic for the second new process scenario; and
  causing the bot to implement the second new bot logic.

6. The method of claim 5, wherein the second new process scenario comprises a change to at least one step of the plurality of steps of the user-executed process.

7. The method of claim 6, wherein:
  the second new process scenario comprises a reordering of the plurality of steps; and
  the determining the second new bot logic comprises updating the stored instruction set to reorder the plurality of steps.

8. The method of claim 6, wherein:
  the second new process scenario comprises a new step for the user-executed process; and
  the determining the second new bot logic comprises updating the stored instruction set to add the new step.

9. The method of claim 6, wherein:
  the second new process scenario comprises a particular step to be deleted; and
  the determining the second new bot logic comprises updating the stored instruction set to delete the particular step.

10. The method of claim 1, wherein the causing comprises updating the bot according to the new bot logic.

11. The method of claim 10, wherein the updating the bot is performed automatically without user configuration.

12. The method of claim 11, wherein the updating the bot comprises facilitating user configuration of the stored instruction set.

13. The method of claim 10, wherein the causing comprises, responsive to the updating, automatically deploying the updated bot on a robotic process automation platform.

14. The method of claim 13, wherein the deployed updated bot executes the user-executed process as a robotic process according to the new bot logic.

15. The method of claim 1, wherein the plurality of user environments comprise a plurality of human-worker environments and a plurality of bot environments.

16. A computer system comprising a processor and memory, wherein the processor and the memory in combination are operable to implement a method comprising:
  initiating monitoring of user interface (UI) activity in a plurality of user environments in which a user-executed process is performed, wherein the user-executed process is defined in a stored instruction set that identifies a plurality of steps of the user-executed process, and wherein the plurality of user environments comprise a first environment operated by a human worker and a second environment operated by a bot;
  responsive to the initiating, detecting a new process scenario for the user-executed process, the new process scenario comprising a UI change in at least one of the plurality of user environments, the detecting comprising:
    comparing real-time UI activity data from at least one user environment of the plurality of user environments to UI data associated with the plurality of steps of the user-executed process;
    matching the real-time UI activity data to a step of the user-executed process; and
    responsive to the matching, determining that a UI for the step has changed;
  determining new bot logic for the new process scenario; and
  causing the bot to implement the new bot logic.

17. A computer-program product comprising a non-transitory computer-usable medium having computer-readable program code embodied therein, the computer-readable program code adapted to be executed to implement a method comprising:
  initiating monitoring of user interface (UI) activity in a plurality of user environments in which a user-executed process is performed, wherein the user-executed process is defined in a stored instruction set that identifies a plurality of steps of the user-executed process, and wherein the plurality of user environments comprise a first environment operated by a human worker and a second environment operated by a bot;
  responsive to the initiating, detecting a new process scenario for the user-executed process, the new process scenario comprising a UI change in at least one of the plurality of user environments, the detecting comprising:
    comparing real-time UI activity data from at least one user environment of the plurality of user environments to UI data associated with the plurality of steps of the user-executed process;
    matching the real-time UI activity data to a step of the user-executed process; and
    responsive to the matching, determining that a UI for the step has changed;
  determining new bot logic for the new process scenario; and
  causing the bot to implement the new bot logic.

18. A method of real-time process monitoring, the method comprising, by a computer system:
  initiating monitoring of user interface (UI) activity in a plurality of user environments in which a user-executed process is performed, wherein the user-executed process is defined in a stored instruction set that identifies a plurality of steps of the user-executed process, and wherein the plurality of user environments comprise a first environment operated by a human worker and a second environment operated by a bot;

responsive to the initiating, detecting a new process scenario for the user-executed process, the new process scenario comprising a relocation of a data field within a UI in at least one of the plurality of user environments;

determining new bot logic for the new process scenario, the determining comprising updating the stored instruction set to indicate a new location of the data field; and causing the bot to implement the new bot logic.

19. The method of claim 18, wherein the determining the new bot logic is performed responsive to a determination that the new process scenario can be automatically handled.

20. The method of claim 18, wherein the determining the new bot logic comprises updating the stored instruction set for the user-executed process.

* * * * *